(12) United States Patent
Dawkins et al.

(10) Patent No.: US 9,891,863 B2
(45) Date of Patent: Feb. 13, 2018

(54) HANDLING SHINGLED MAGNETIC RECORDING (SMR) DRIVES IN A TIERED STORAGE SYSTEM

(71) Applicant: Dell Products, L.P., Round Rock, TX (US)

(72) Inventors: William Price Dawkins, Austin, TX (US); Kevin Thomas Marks, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 89 days.

(21) Appl. No.: 14/815,755

(22) Filed: Jul. 31, 2015

(65) Prior Publication Data
US 2017/0031630 A1    Feb. 2, 2017

(51) Int. Cl.
*G06F 3/06* (2006.01)

(52) U.S. Cl.
CPC .......... *G06F 3/0653* (2013.01); *G06F 3/0608* (2013.01); *G06F 3/0632* (2013.01); *G06F 3/0688* (2013.01); *G06F 3/0689* (2013.01)

(58) Field of Classification Search
CPC .... G06F 3/0653; G06F 3/0608; G06F 3/0632; G06F 3/0688; G06F 3/0689
See application file for complete search history.

(56) References Cited

U.S. PATENT DOCUMENTS

2016/0077988 A1* 3/2016 Tipton .................... G06F 13/28 710/308
2017/0011048 A1* 1/2017 Wideman .......... G06F 17/30073

* cited by examiner

*Primary Examiner* — Eric S Cardwell
(74) *Attorney, Agent, or Firm* — Fogarty LLP

(57) ABSTRACT

Systems and methods for handling Shingled Magnetic Recording (SMR) drives in a tiered storage system. In some embodiments, an Information Handling System (IHS) may include a processor; and a memory coupled to the processor, the memory having program instructions stored thereon that, upon execution by the processor, cause the IHS to: identify, among data stored in a first storage medium, a data subset that has a selected access pattern, wherein the selected access pattern is indicative of how often data is updated; and move the data subset from the first storage medium to one or more SMR drives.

12 Claims, 2 Drawing Sheets

HANDLING SHINGLED MAGNETIC RECORDING (SMR) DRIVES IN A TIERED STORAGE SYSTEM

FIELD

This disclosure relates generally to computer systems, and more specifically, to systems and methods for handling Shingled Magnetic Recording (SMR) drives in a tiered storage system.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In the context of IHSs, a hard disk drive (HDD) is a data storage device used for storing and retrieving digital information using one or more rotating magnetic disks. The disks are paired with magnetic heads arranged on a mechanical arm, which can then read and write data from/to the rotating surface. Data is accessed in a random-access manner such that individual blocks of data can be stored and retrieved in any order.

A Shingled Magnetic Recording (SMR) drive is a special type of HDD where relatively wide tracks are written to the magnetic disk, and successively written data tracks partially overlap previous ones (similar to the manner roof shingles are applied). As such, SMR drives can store significantly more information per unit area than conventional HDDs. The inventors hereof have determined, however, that for certain input/output (I/O) access patterns, SMR drives perform worse than standard HDDs—particularly when tiered storage is used.

SUMMARY

Embodiments of systems and methods for handling SMR drives in a tiered storage system are described herein. In an illustrative, non-limiting embodiment, an Information Handling System (IHS) may include a processor and a memory coupled to the processor, the memory having program instructions stored thereon that, upon execution by the processor, cause the IHS to: identify, among data stored in a first storage medium, a data subset that has a selected access pattern; and move the data subset from the first storage medium to one or more Shingled Magnetic Recording (SMR) drives.

The first storage medium may belong to a given tier of a hierarchical storage system and the one or more SMR drives may belong to another tier lower than the given tier in the hierarchical storage system. For example, the first storage medium may include one or more Solid State Drive (SSD) drives. Additionally or alternatively, the first storage medium may belong to a given tier of a hierarchical storage system and the one or more SMR drives may belong to the given tier. For example, the first storage medium may include one or more Hard Disk Drive (HDD) drives. And, in various embodiments, the selected access pattern may be indicative of how often data is modified.

To identify the data subset, the program instructions, upon execution by the processor, may further cause the IHS to: examine metadata associated with data areas within the first storage medium; and identify, using the metadata, one or more data areas for which corresponding last-modified-fields have the oldest values among other data areas. Additionally or alternatively, to identify the data subset, the program instructions may further cause the IHS to: monitor a usage of the first storage medium; and examine the metadata in response to the usage indicating that a threshold has been reached. Additionally or alternatively, to identify the data subset, the program instructions may further cause the IHS to: examine metadata associated with data areas within the first storage medium; and identify, using the metadata, one or more data areas for which a corresponding time-since-last-modification is above a threshold value.

The program instructions, upon execution by the processor, may also cause the IHS to: identify a portion of the data subset that does not have the selected access pattern; and move the portion of the data subset from the one or more SMR drives to the first storage medium.

In another illustrative, non-limiting embodiment, a computer-implemented method may include identifying, among data stored in a first storage medium, a data subset that has a selected access pattern, where the selected access pattern is indicative of how often data is updated; and moving the data subset from the first storage medium to one or more SMR drives.

The first storage medium may include one or more SSD drives that belong to a given tier of a hierarchical storage system and the one or more SMR drives may belong to another tier lower than the given tier in the hierarchical storage system. Additionally or alternatively, the first storage medium may include one or more HDD drives and may belong to a given tier of a hierarchical storage system and the one or more SMR drives may belong to the given tier.

In some embodiments, identifying the data subset further may include monitoring a usage of the first storage medium; examining metadata associated with data areas within the first storage medium in response to the usage indicating that a threshold has been reached; and identifying, using the metadata, one or more data areas for which corresponding last-modified-fields have the oldest values among other data areas. Additionally or alternatively, identifying the data subset may include examining metadata associated with data areas within the first storage medium; and identifying, using the metadata, one or more data areas for which a corresponding time-since-last-modification is above a threshold value.

The method may further comprise identifying a portion of the data subset that has another selected access pattern; and moving the portion of the data subset from the one or more SMR drives to the first storage medium.

In yet another illustrative, non-limiting embodiment, a storage device may have program instructions stored thereon that, upon execution by an IHS, cause the IHS to: identify, among data stored in a first storage medium, a data subset that has a selected access pattern, wherein the selected access pattern is indicative of how often data is updated; and move the data subset from the first storage medium to one or more SMR drives.

To identify the data subset, the program instructions, upon execution, may further cause the IHS to: monitor a usage of the first storage medium; examine metadata associated with data areas within the first storage medium in response to the usage indicating that a threshold has been reached; and identify, using the metadata, one or more data areas for which corresponding last-modified-fields have the oldest values among other data areas. Additionally or alternatively, to identify the data subset, the program instructions, upon execution, further cause the IHS to: examine metadata associated with data areas within the first storage medium; and identify, using the metadata, one or more data areas for which a corresponding time-since-last-modification is above a threshold value. Additionally or alternatively, the program instructions may further cause the IHS to identify a portion of the data subset that has a different access pattern; and move the portion of the data subset from the one or more SMR drives to the first storage medium.

In some embodiments, the method described herein may be implemented by an IHS. Additionally or alternatively, an IHS may include a processor and a memory coupled to the processor, the memory having program instructions stored thereon that, upon execution by the processor, cause an IHS to perform a number of operations. Additionally or alternatively, a storage device may have program instructions stored thereon that, upon execution by an IHS, cause the IHS to perform a number of operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
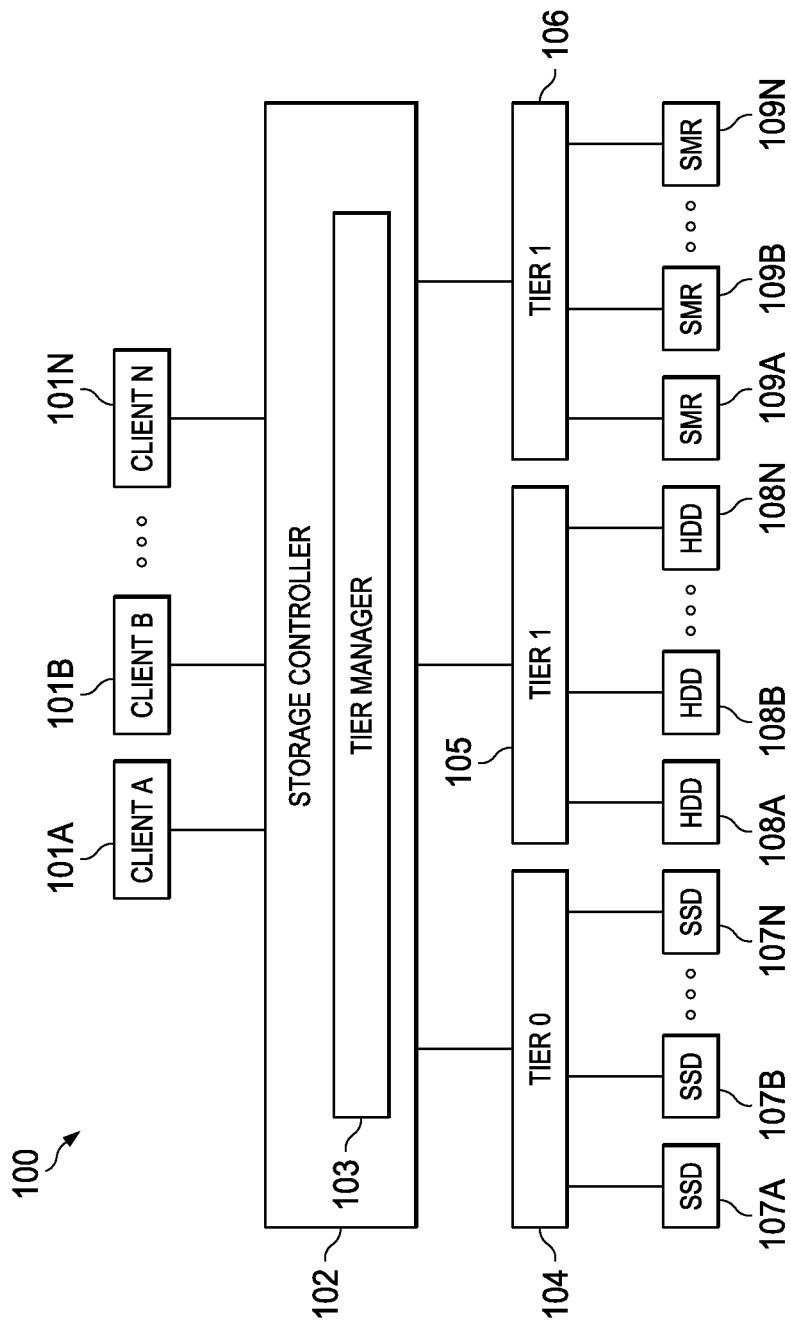
FIG. 1 is a diagram illustrating an example of an environment where systems and methods for handling Shingled Magnetic Recording (SMR) drives in a tiered storage system may be implemented according to some embodiments.

A new type of technology has been recently introduced that increases the storage capacity of conventional hard drives. In a conventional HDD, the width or pitch of a drive track needed for reading data is narrower than the pitch required for writing data. Shingled Magnetic Recording (SMR) technology exploits this feature by overlapping tracks as they are written. The way data blocks are aligned is similar to the way shingles are laid out on the roof of a house. As a consequence, SMR drives have much higher capacities than standard HDDs (per unit area).

However, in SMR drives, data is written at the end of a track in a linear fashion. When a block is modified in the middle of a track, the drive marks the original block as unused and remaps the block address to the current location of the write pointer in the active track. The blocks in the middle of a track marked as unused cannot be reused until a "garbage collection" process is completed, which can be very expensive in terms of performance. Thus, as the inventors hereof have determined, SMR drives are particularly well-suited to I/O patterns where data is modified infrequently relative to the amount of times they are read.

In a tiered storage system, storage technologies of different types are grouped together in two or more tiers to provide different efficiencies for storing and retrieving data. For example, a storage system may have a first tier (e.g., "tier 0") made of expensive Solid State Drives (SSDs) for frequently accessed data. As data ages, it is accessed less frequently and can be moved to a lower tier (e.g., "tier 1") comprised of less expensive, conventional HDDs. The key to making tiered storage systems usable is to enable a storage controller to move data automatically between tiers as needed.

Techniques for deciding how to move data to progressively lower tiers include the "Least Recently Used" (LRU) and the "Least Frequently Used" (FRU) algorithms. When a storage controller employs an LRU algorithm, access statistics are kept for individual areas of data in a higher tier. Periodically, or as new data is stored in the system, the storage controller will decide to move data from a higher tier to a lower tier based on which data was least recently used (read or written). Conversely, when employing an LFU algorithm, the storage controller moves data that is least frequently used (read or written) to a lower tier.

A unique problem with using SMR drives in a tiered storage systems is that, for certain data access patterns, a tier made of SMR drives can underperform a tier made of conventional HDDs. And again, this problem occurs due to SMR's shingled structure. By determining the data with access patterns better suited for storage in SMR drives, one can store that data on less expensive media and still provide the performance required. Accordingly, to address this problem, systems and methods for handling SMR drives described herein may employ new techniques referred to as "Least Recently Modified" (LRM) and "Least Frequently Modified" (LFM), which are explained in more detail below.

FIG. 1 is a diagram illustrating an example of environment 100 where systems and methods for handling SMR drives in a tiered storage system may be implemented. In various embodiments, client devices 101A-N may assume the form of any IHS, computer, tablet, smart phone, etc., or any other electronic device or appliance with data processing capabilities. Each of client devices 101A-N is coupled to storage controller 102, either directly or via a network.

In various embodiments, a network (not shown) may include one or more wireless networks, circuit-switched networks, packet-switched networks, or any combination thereof to enable communications between two or more of IHSs. For example, a network may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

Storage controller 103 includes tier manager component 103 configured to distribute and manage data stored in the tiered storage system that includes components 104-106. In this implementation, a first tier ("tier 0") controller 104 manages a number of SSD drives 107A-N. A second, lower tier ("tier 1") controller 105 manages HDD drives 108A-N, whereas yet another "tier 1" controller 106 manages SMR drives 109A-N. Again, communications between storage controller 102 and tier controllers 104-106, and also between each of tier controllers 104-106 and their respective storage drives, may be had at least in part over the network.

In the architecture of FIG. 1, SSD drives 107A-N belong to a higher tier (tier 0) than HDD drives 108A-N and SMR drives 109A-N (tier 1). Conversely, both HDD drives 108A-N and SMR drives 109A-N are all considered to be in the same tier (tier 1). It should be noted, however, that in other storage system implementations a different numbers of tiers with varying degrees of complexity may be used.

Although HDD drives 108A-N and SMR drives 109A-N belong to the same tier, they can still perform differently compared to one another depending upon the data access patterns. To address this issue, in various embodiments tier manager 103 may be configured to perform conventional LRU and/or LFU algorithms to move data between tier 0 and tier 1, for example—but it may then use the new LRM and/or LFM algorithms described below to move data between different types of drives within the same tier (e.g., tier 1).

For example, in operation tier manager 103 of storage controller 102 may attempt to place frequently accessed data on tier 0. As storage controller 102 moves more and more data to SSD drives 107A-N in tier 0, it may need to make space for that new data by migrating older data to the lower tier ("tier 1"). Again, conventional LRU and LFU algorithms may be used for determining which data should be moved from a given tier to lower tier. When data is moved from tier 0 to tier 1, the data can remain in tier 1 and still be accessed. In some cases, storage controller 102 may move the data up from tier 1 back to tier 0, for example, in response to that data again becoming "frequently" accessed.

To perform these various LRU and/or LFU operations, I/O or access statistics may be maintained by tier manager 103 that indicate, for each data area (e.g., block, bucket, page, or range), when and/or how often data stored in that area has been read. Such statistics may be kept, for instance, in the form of a table and/or metadata for each data area.

Additionally or alternatively, when or after data is demoted from tier 0 to tier 1, an LRM or LFM operation may be performed to determine whether to store the demoted data onto either HDD drives 108A-N or SMR drives 109A-N. Similarly, for data already stored in tier 1, LRM or LFM operations may be used to determine whether to move that data between HDD drives 108A-N and SMR drives 109A-N. In a first implementation, data may be moved to SMR drives 109A-N in response to HDD drives 108A-N reaching a maximum threshold usage value (e.g., % free space) in a reactive manner. In a second implementation, data may be moved to SMR drives periodically in an active manner. These different implementation are described in FIGS. 2 and 3, respectively.

Figure 2:
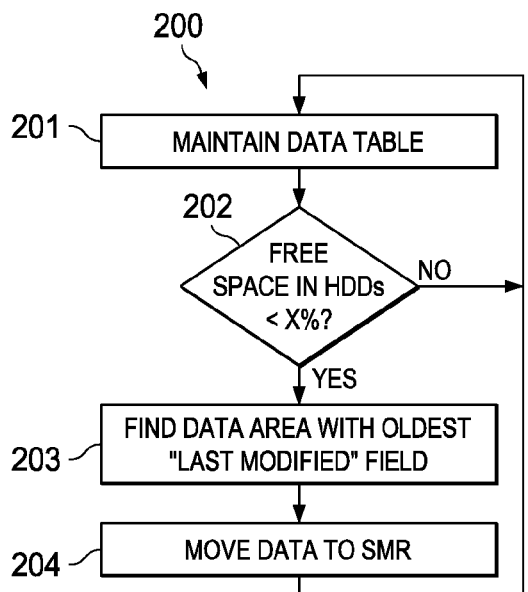
FIG. 2 is a flowchart of an example of a first method for handling SMR drives according to some embodiments.

FIG. 2 is a flowchart of an example of method 200 for handling SMR drives. In various embodiments, method 200 may be performed, at least in part, by tier manager 103 of storage controller 102. At block 201, method 200 includes maintaining a data table that stores metadata for each data area of each storage device, including a "last modified field" for each data area. At block 202, method 200 determines whether the free space in HDD drives 108A-N has reached a maximum threshold value (e.g., X %). If not, control returns to block 201.

When the free space in HDD drives 108A-N reaches the threshold, however, block 203 finds the data are with the oldest time in the "last modified field." Then, block 204 moves that data from HDD drives 108A-N to SMR drives 109A-N. In some cases, method 200 may be combined with LRU or LFU algorithms such that, at the same time that the data is demoted from tier 0 to tier 1, a determination of whether the demoted data should be stored in HDD drives 108A-N or SMR drives 109A-N is also performed.

In the reverse scenario, data may be moved from SMR drives 109A-N to HDD drives 108A-N when the free space in HDD drives 108A-N has reached a minimum threshold value (e.g., Z % smaller than X %) or when the free space in HDD drives 108A-N has not yet reached the maximum threshold value, and in response to certain data stored in SMR drives 109A-N being recently modified or updated more frequently. Additionally or alternatively, recently modified or frequently updated data may be moved directly from SMR drives 109A-N to SSD drives 107A-N.

Figure 3:
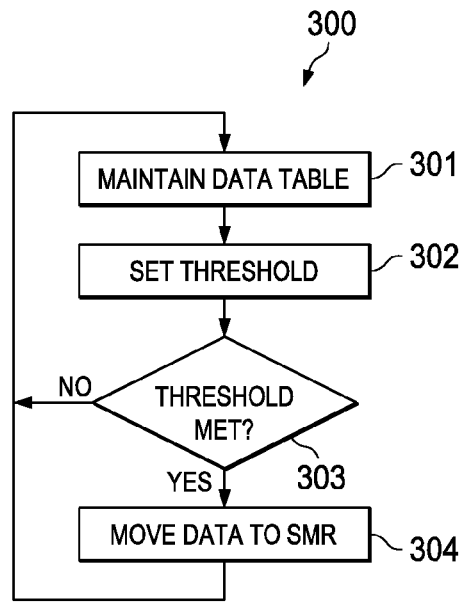
FIG. 3 is a flowchart of an example of a second method for handling SMR drives according to some embodiments.

FIG. 3 is a flowchart of an example of method 300 for handling SMR drives. In various embodiments, method 300 may be performed, at least in part, by tier manager 103 of storage controller 102. As with FIG. 2, here at block 301 method 300 also maintains a data table that stores metadata for each data area of all storage devices, including a "last modified field." At block 302 a system threshold is set such that any data that has not been modified in the last time interval "y" may be moved from SSD drives 107A-N or HDD drives 108A-N to SMR drives 109A-N.

At block 303, method 300 checks the "last modified field" of all the data areas in HDD drives 108A-N, for example. For each data area, block 303 may calculate the "time since last modification" by subtracting the "last modified field" for that data area from the current time. Then, block 303 may determine whether any data area has its "time since last modification" greater than "y." If not, control returns to block 301. Otherwise, at block 304, the data within data areas where the "time since last modification" is greater than "y" is moved to SMR drives 109A-N.

Again, in the reverse scenario, data may be moved from SMR drives 109A-N to HDD drives 108A-N or SSR drives 107A-N if that data becomes such that the "time since last modification" is greater than "y" or a differently selected threshold value. Therefore, in an LMR scheme, data is not moved from SMR drives 109A-N to HDD drives 108A-N based on read access. Rather the data is moved when it is modified. To further minimize moving data that is not frequently modified, tier manager 103 may be configured to only move a data area from SMR drives 109A-N to HDD drives 108A-N if the area is modified a predetermined number of times (n) over a predetermined time period (t).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of NVMs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 4:
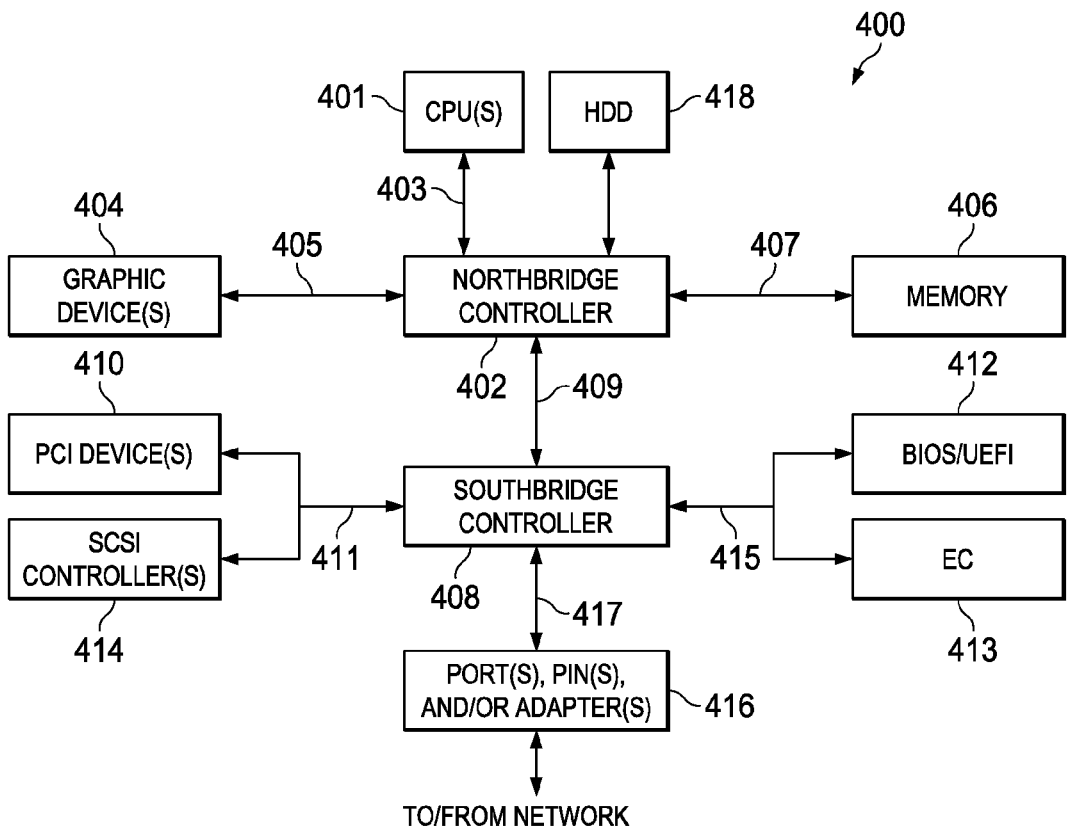
FIG. 4 is a block diagram of an example of an Information Handling System (IHS) according to some embodiments.

FIG. 4 is a block diagram of an example of an IHS. In some embodiments, IHS 400 may be used to implement any of client devices 101A-N and/or storage controller 102. Moreover, IHS 400 may include a number of components, several of which may be physically disposed on a motherboard (not shown) or other printed circuit board (PCB). For example, in various embodiments, IHS 400 may be a single-processor system including one CPU 401, or a multi-processor system including two or more CPUs 401 (e.g., two, four, eight, or any other suitable number). CPU(s) 401 may include any processor capable of executing program instructions. For example, in various embodiments, CPU(s) 401 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 401 may commonly, but not necessarily, implement the same ISA.

CPU(s) 401 are coupled to northbridge controller or chipset 401 via front-side bus 403. Northbridge controller 402 may be configured to coordinate I/O traffic between CPU(s) 401 and other components. For example, in this particular implementation, northbridge controller 402 is coupled to graphics device(s) 404 (e.g., one or more video cards or adaptors) via graphics bus 405 (e.g., an Accelerated Graphics Port or AGP bus, a Peripheral Component Interconnect or PCI bus, or the like). Northbridge controller 402 is also coupled to system memory 406 via memory bus 407, and to hard disk drive (HDD) 418. Memory 406 may be configured to store program instructions and/or data accessible by CPU(s) 401. In various embodiments, memory 406 may be implemented using any suitable memory technology, such as static RAM (SRAM), synchronous dynamic RAM (SDRAM), nonvolatile/Flash-type memory, or any other type of memory. Conversely, HDD 418 may include any magnetic, solid-state (SSD), or hybrid data storage device capable of storing an OS and other applications.

Northbridge controller 402 is coupled to southbridge controller or chipset 408 via internal bus 409. Generally speaking, southbridge controller 408 may be configured to handle various of IHS 400's I/O operations, and it may provide interfaces such as, for instance, Universal Serial Bus (USB), audio, serial, parallel, Ethernet, or the like via port(s), pin(s), and/or adapter(s) 416 over bus 417. For example, southbridge controller 408 may be configured to allow data to be exchanged between IHS 400 and other devices, such as other IHSs attached to a network. In various embodiments, southbridge controller 408 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 408 may also enable connection to one or more keyboards, keypads, touch screens, scanning devices, voice or optical recognition devices, or any other devices suitable for entering or retrieving data. Multiple I/O devices may be present in IHS 400. In some embodiments, I/O devices may be separate from IHS 400 and may interact with IHS 400 through a wired or wireless connection. As shown, southbridge controller 408 is further coupled to one or more PCI devices 410 (e.g., modems, network cards, sound cards, or video cards) and to one or more SCSI controllers 414 via parallel bus 411.

Southbridge controller 408 is also coupled to BIOS/UEFI 412 and to EC 413 via Low Pin Count (LPC) bus 415. BIOS/UEFI 412 includes non-volatile memory having program instructions stored thereon. Those instructions may be usable by CPU(s) 401 to initialize and test other hardware components and/or to load an OS onto IHS 400.

EC 413 combines interfaces for a variety of lower bandwidth or low data rate devices that are typically coupled to IHS 400. Such devices may include, for example, floppy disks, parallel ports, keyboard and mouse, temperature sensor and fan speed monitoring/control, among others. In various implementations, southbridge controller 408 may be configured to allow data to be exchanged between EC 413 (or BIOS/UEFI 412) and another IHS attached to a network device or server (e.g., a remote server) using wired or wireless capabilities of network interface adapter (NIC) 416.

In some cases, IHS 400 may be configured to provide access to different types of computer-accessible media separate from memory 406. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 400 via northbridge controller 402 and/or southbridge controller 408.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 400 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 402 may be combined with southbridge controller 408, and/or be at least partially incorporated into CPU(s) 401. In other implementations, one or more of the devices or components shown in FIG. 4 may be absent, or one or more other components may be added. Accordingly, systems and methods described herein may be implemented or executed with other IHS configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution by the processor, cause the IHS to:
      identify, among data stored in a first tier comprising one or more Solid State Drives (SSD) drives in a tiered storage system, a first subset of data having at least: a selected Least Recently Used (LRU) value or a selected Least Frequently Used (LFU) value;
      move the first subset of data from the first tier to a second tier comprising one or more Hard Disk Drive (HDD) drives and one or more Shingled Magnetic Recording (SMR) drives;
      identify, among the first subset of data, a second subset of data that is modified less frequently than read; and
      move the second subset of data from the one or more HDD drives to the one or more SMR drives.

2. The IHS of claim 1, wherein to identify the second subset of data, the program instructions, upon execution by the processor, further cause the IHS to:
   examine metadata associated with data areas within the one or more HDD drives; and
   identify the second subset of data, using the metadata, as one or more data areas that have not been written to more than a predetermined number of times over a predetermined time period.

3. The IHS of claim 2, wherein to identify the second subset of data, the program instructions, upon execution by the processor, further cause the IHS to:
   monitor a usage of the one or more HDD drives; and
   examine the metadata in response to the usage indicating that a capacity threshold has been reached.

4. The IHS of claim 2, the memory having program instructions stored thereon that, upon execution by the processor, cause the IHS to:
   identify, among the second subset of data, a third subset of data as one or more data areas that have been written to at least the predetermined number of times over the predetermined time period; and
   move the third subset of data from the one or more SMR drives to the one or more HDD drives.

5. A computer-implemented method, comprising:
   identifying, among data stored in a first tier comprising one or more Solid State Drives (SSD) drives in a tiered storage system, a first subset of data having at least: a selected Least Recently Used (LRU) value or a selected Least Frequently Used (LFU) value;
   moving the first subset of data from the first tier to a second tier comprising one or more Hard Disk Drive (HDD) drives and one or more Shingled Magnetic Recording (SMR) drives;
   identifying, among the first subset of data, a second subset of data that is modified less frequently than read; and
   moving the second subset of data from the one or more HDD drives to the one or more SMR drives.

6. The computer-implemented method of claim 5, wherein identifying the data subset further comprises:
   monitoring a usage of the one or more HDD drives;
   examining metadata associated with data areas within the one or more HDD drives in response to the usage indicating that a threshold has been reached; and
   identifying the second subset of data, using the metadata, as one or more data areas that have not been written to more than a predetermined number of times over a predetermined time period.

7. The computer-implemented method of claim 6, wherein identifying the second subset of data further comprises identifying, using the metadata, one or more data areas for which a corresponding time-since-last-modification is above a threshold value.

8. The computer-implemented method of claim 6, further comprising:
   identifying, among the second subset of data, a third subset of data as one or more data areas that have been written to at least the predetermined number of times over the predetermined time period; and
   moving the third subset of data from the one or more SMR drives to the one or more HDD drives.

9. A storage device having program instructions stored thereon that, upon execution by an Information Handling System (IHS), cause the IHS to:
   identify, among data stored in a first tier comprising one or more Solid State Drives (SSD) drives in a tiered storage system, a first subset of data having at least: a selected Least Recently Used (LRU) value or a selected Least Frequently Used (LFU) value;
   move the first subset of data from the first tier to a second tier comprising one or more Hard Disk Drive (HDD) drives and one or more Shingled Magnetic Recording (SMR) drives;
   identify, among the first subset of data, a second subset of data that is modified less frequently than read; and move the second subset of data from the one or more HDD drives to the one or more SMR drives.

10. The storage device of claim 9, wherein to identify the data subset, the program instructions, upon execution, further cause the IHS to:

monitor a usage of the one or more HDD drives;

examine metadata associated with data areas within the one or more HDD drives in response to the usage indicating that a capacity threshold has been reached; and identify the second subset of data, using the metadata, as one or more data areas that have not been written to more than a predetermined number of times over a predetermined time period.

11. The storage device of claim 10, wherein the program instructions, upon execution, further cause the IHS to:

identify, among the second subset of data, a third subset of data as one or more data areas that have been written to at least the predetermined number of times over the predetermined time period; and move the third subset of data from the one or more SMR drives to the one or more HDD drives.

12. The storage device of claim 9, wherein to identify the second subset of data, the program instructions, upon execution, further cause the IHS to identify, using the metadata, one or more data areas for which a corresponding time-since-last-modification is above a threshold value.

\* \* \* \* \*